INVENTOR
JOSEPH R. GEIGER
BY
Brumbaugh, Free, Graves & Donohue
HIS ATTORNEYS

March 7, 1961 J. R. GEIGER 2,974,190

ELECTRONIC MATTING APPARATUS

Filed Dec. 9, 1957 2 Sheets-Sheet 2

INVENTOR
JOSEPH R. GEIGER
BY
Brumbaugh, Free, Graves & Donohue
HIS ATTORNEYS

United States Patent Office 2,974,190

Patented Mar. 7, 1961

2,974,190

ELECTRONIC MATTING APPARATUS

Joseph R. Geiger, Levittown, N.Y., assignor to Columbia Broadcasting System, Inc., New York, N.Y., a corporation of New York Filed Dec. 9, 1957, Ser. No. 701,513

15 Claims. (Cl. 178—7.1)

Figure 1:
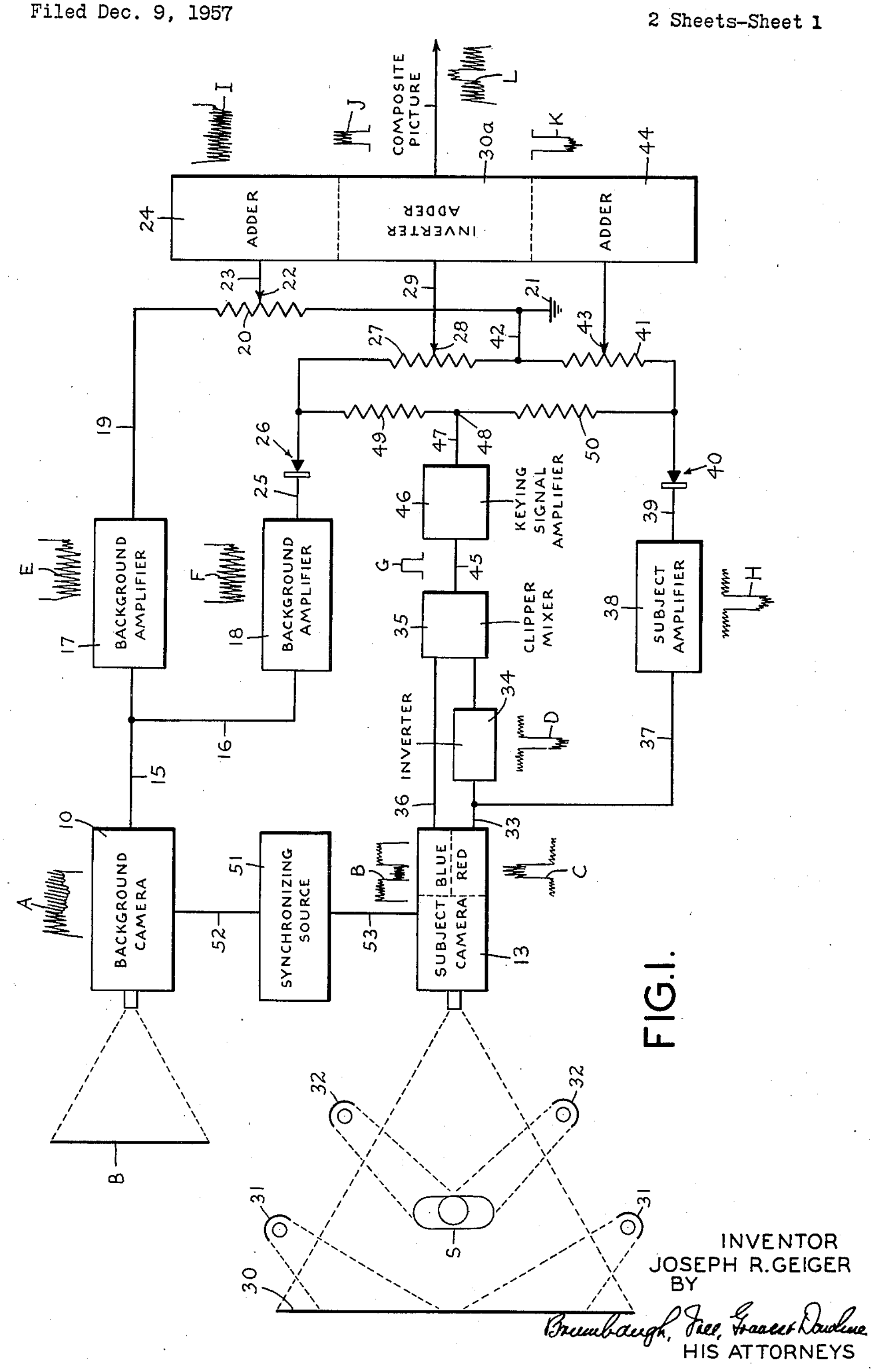

The present invention relates to electronic matting and montaging methods and apparatus for producing special effects, such as a composite picture of a subject and a background other than that before which the subject stands as it is being scanned, for example.

Composite pictures of this kind may be produced by scanning foreground and background objects, respectively, by synchronized television cameras, the foreground object having markedly different light reflecting properties from the background against which it is scanned. From the foreground scanning camera is derived a signal representing a silhouette of the foreground, which is combined with the background scanning camera signal to form a hole in the latter into which the foreground scanning camera signal is inserted to form the composite picture.

In any such matting system, an essential requirement is the production of a signal which enables the video intelligence of the subject to be sharply differentiated from the actual background behind the subject. Heretofore, this has been accomplished in a variety of ways utilizing for this purpose, for example, differences in color or reflectivity between the subject and the background before which it stands.

It is an object of the invention to provide new and improved electronic matting and montaging methods and apparatus in which a signal clearly delineating the boundary between the subject and its actual background is derived in a novel and highly effective manner.

Another object of the invention is to provide new and improved electronic matting and montaging methods and apparatus of the above character which enable matting and montaging effects to be achieved in color television.

A further object of the invention is to provide new and improved electronic matting and montaging methods and apparatus of the above character which are capable of producing a composite picture in which there is no appreciable switching transition line at the leading and trailing edges of the matted subject.

According to the invention, the subject is placed before a background of a high intensity color of high luminance which is present in the subject only in a small amount. While other colors can be used, the color of the background is preferably a saturated blue of high luminance, since there is a relatively small amount of blue energy in scenes generally and in flesh tones in particular. The subject and its background are scanned by television camera means responsive, respectively, only to the color of the background (blue) and to a color such as red which is present in the background only in small amounts or preferably not at all. The two signals from the television camera means are combined in opposition to produce a resultant signal in which the peak amplitude of the background is considerably greater than (approximately twice) the peak amplitude of the background in the output of the blue responsive camera means. The resultant signal, which affords a marked difference in amplitude between the subject and its background, is then used to effect switching between the subject camera means and other camera means scanning the background in front of which it is desired to have the subject appear in the final composite picture.

The invention also contemplates the provision of improved switching means for switching between the subject and background signals without introducing a switching transition line at the leading and trailing edges of the matted subject.

In a black and white system, the black and white subject picture can be derived from the red responsive camera means which could be made yellow or green responsive, if desired, to improve the color response without adversely affecting the matting technique.

In a tricolor television system, conventional tricolor television cameras might be used for the subject and the background against which it is desired to have it appear. The matting control signal could then be derived from the blue and red channels of the subject camera in the manner described above and used to effect switching between an encoded signal derived from the three color channels of the subject camera and an encoded signal derived from the three color channels of the background camera as described in greater detail below.

Figure 2:
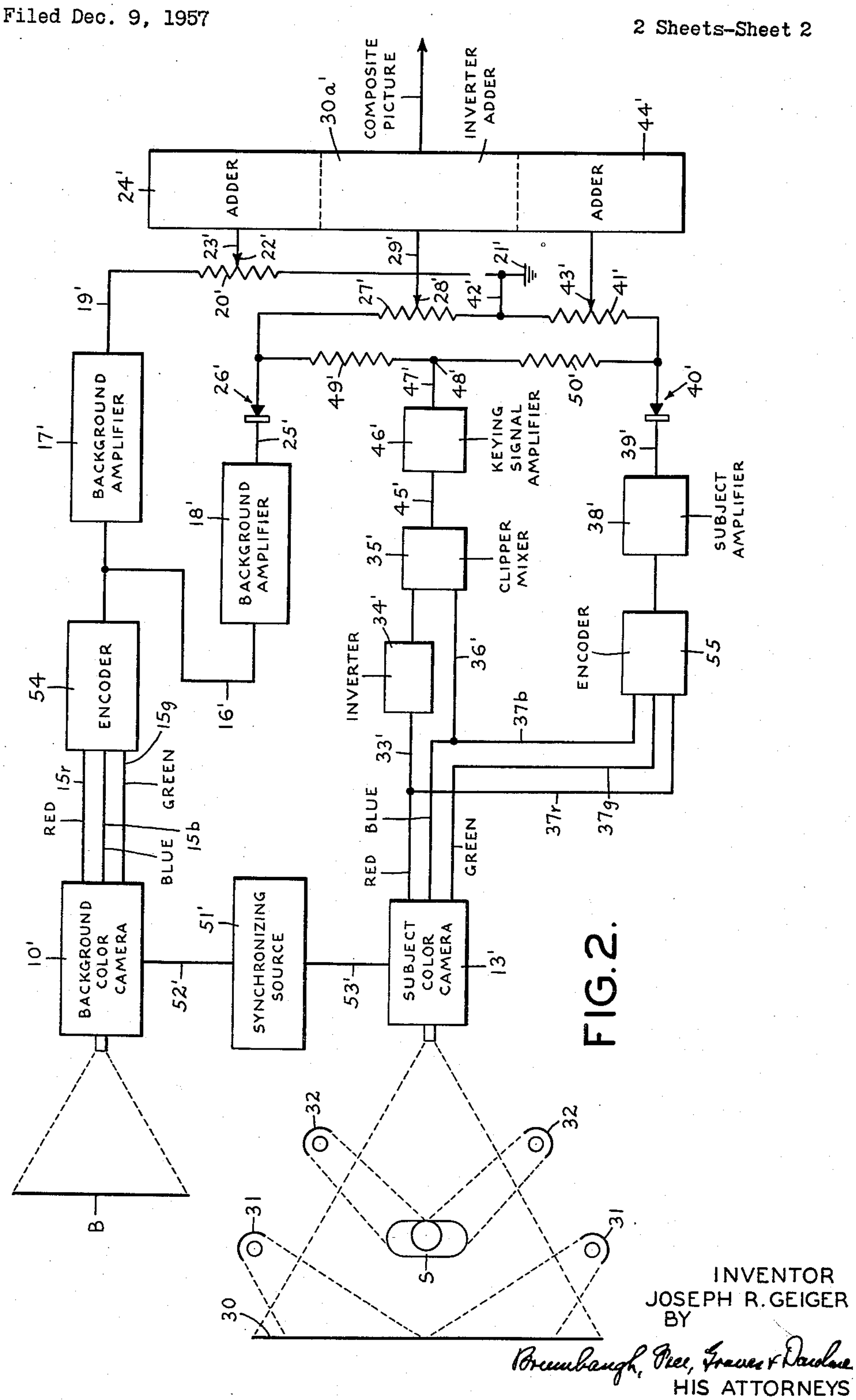

For a better understanding of the invention, reference is made to the following detailed description of several representative embodiments thereof, taken in conjunction with the accompanying drawings, in which:

Fig. 1 is a block diagram illustrating electronic matting apparatus constructed according to the invention for producing a composite black and white picture; and Fig. 2 is a block diagram illustrating one way of modifying Fig. 1 in order to obtain a composite picture in color.

Broadly speaking, electronic matting is accomplished according to the invention by separately scanning a subject and a background to provide subject and background signals, respectively. Subject signals representing at least two different color components are obtained and from them is derived a keying signal. The keying signal is employed to blank out a corresponding portion of the background signal into which the subject signal is inserted to form a composite signal.

In the representative embodiment shown in Fig. 1, the background signal is produced by a background camera 10, which may be a standard black and white television camera, positioned to scan a background B against which a subject S scanned by a separate subject camera 13, as described in greater detail below, is to appear in the composite picture.

The output of the background camera 10 is fed over conductor means 15 and 16 to a pair of background amplifiers 17 and 18, respectively, which may be of conventional form. The amplifier 17 supplies an inverted and amplified output over conductor means 19 to a potentiometer 20 which is grounded at 21, as shown. The adjustable contact 22 of the potentiometer 20 feeds one input over conductor means 23 to a conventional adder circuit 24.

The second background amplifier 18 supplies an output over conductor means 25 through a normally non-conductive unidirectionally conductive device 26 to a potentiometer 27. The potentiometer 27 is also connected to ground at 21, as shown, and it has an adjustable contact 28 connected by conductor means 29 to conventional inverter adder means 30*a*, the purpose of which will be explained later.

In order to obtain video signals in which the video intelligence of the subject S is sharply delineated with respect to that of the actual background 30 against which it stands, first the background 30 is illuminated by light affording the maximum difference between it and the subject S. Secondly, the subject camera 13 which scans the subject S and background 30 is provided with two camera tubes (not shown), one responsive to the color of the background 30 and the other responsive to a color which is present in the background only to a slight degree or preferably not at all.

While other colors may be used, preferably the color of the actual background 30 for the subject S should be a saturated blue of high luminance. In such case, the subject camera 13 may comprise separate television camera tubes responsive, respectively, to blue and red, for example. The subject S may also be illuminated with white light, for example, by lamps 32.

According to the invention, a substantial increase in the differential between the blue background 30 and the subject S is achieved by reversing the polarity of the red signal from the subject camera 13 and adding it to the blue signal from the same camera. To this end, the red signal output from the subject camera 13 is fed through the conductor 33 to a conventional inverter 34 which supplies one input to a conventional clipper mixer device 35 connected to receive as a second input the blue signal output from the subject camera 13 over conductor means 36.

The red signal output from the camera 13 may be taken as the subject signal and it is fed over conductor means 33 and 37 to a conventional subject amplifier 38. The output of the amplifier 38 is fed through conductor means 39 and a normally nonconductive unilaterally conductive device 40 to a potentiometer 41. The potentiometer 41 is grounded by conductor means 42 to the point 21 and it has an adjustable contact 43 which supplies an output to conventional adder means 44 which performs a function to be described later.

By adding the video information from the red channel with reversed polarity to the video information with normal polarity, the video signal from the blue background 30 will peak much higher than the signal from the subject. This will be readily apparent when it is observed that a saturated spectral blue peaking one volt in the blue channel would peak zero in the red. Reversing the polarity of the red and adding it to the blue would thus produce a two-volt peak from the saturated blue high luminance background.

As a result, a good separation can be obtained between the blue background 30 and black and white and any other hue about the subject S except blue. However, under normal conditions, blue clothing contains enough red energy to give satisfactory separation with the technique described above. Moreover, saturated blue clothing normally falls below the luminance level of flesh tones. Hence, no garment worn by the subject S would be likely to have as high a blue luminance as the background 30 and, in any event, it would be simple to control.

The output of the clipper mixer, which is of the form indicated by the curve G in Fig. 1, constitutes a keying signal which is fed by conductor means 45 to a keying signal amplifier 46. The amplifier 46 is connected by conductor means 47 to the junction 48 between two like resistors 49 and 50 which are connected in series between the unilaterally conductive devices 26 and 40.

In operation, the scanning functions effected by the background camera 10 and the subject camera 13 are maintained in synchronism by synchronizing signals from a conventional source 51 over the conductor means 52 and 53. The signal output of the background camera 10, which is of the form represented by the curve A, is supplied over the conductor means 15 to the background amplifier 17. The latter provides an inverted and amplified signal of the form illustrated generally by the curve E over the conductor means 19 and the potentiometer 20 to the adder 24.

The output of the background camera 10 is also fed over the conductor means 16 to the second background amplifier 18 where it is inverted and amplified and fed to the conductor means 25 in the form of a wave like that represented by the curve F. However, the unilaterally conductive device 26 is normally nonconductive except for the duration of the keying pulse provided by the amplifier 46, as described in greater detail below.

The red signal output from the subject camera 13 is inverted and amplified and appears at the conductor means 39 in the form indicated generally by the curve H. The unilaterally conductive device 40, however, is normally nonconductive except when a keying pulse is provided by the amplifier 46.

Hence, during the beginning and end portions of each scanning line when the subject camera 13 is scanning only the backgroud 30, the inverted amplified background signal is being supplied to the adder 24 but no input signals are being fed to the inverter adder 30*a* and the adder 44.

Meanwhile, the blue signal output from the subject camera 13, which is of the form indicated by the curve B, and the red output of the subject camera 13 inverted to the form represented by the curve D, are fed as inputs to the clipper mixer 35 producing a keying pulse of the shape represented by the curve G. This pulse is amplified in the amplifier 46 and is fed through the conductor means 47 and the resistors 49 and 50 to the unilaterally conductive devices 26 and 40, respectively. The latter are thereby rendered conducting for the duration of the pulse.

The keying pulse then mixes with the background signal from the amplifier 18 and is fed through the conductor means 39 to the inverter adder 30*a* where it is inverted and added to the picture signal from the background amplifier 17 as received from the adder 24. Since these two signals are opposite in polarity as represented by the curves I and J, the information from the background amplifier 18 has the effect of cancelling out the information from the background amplifier 17 for this interval.

Simultaneously, the keying signal from the amplifier 46 mixes with the signal from the subject amplifier 38. The mixed signal is fed from the adjustable contact 43 to the adder 44 which adds the mixed subject signal and keying pulse represented by the curve K to the mixture of background signals and keying pulse produced by the inverter adder. Since the keying pulse component added to the subject information is directly opposite the keying signal component added to the background information from the amplifier 18 in the inverter adder 30*a*, the two components cancel. The resultant of all of the added signals is of the form indicated by the curve L and it represents a matted or composite picture in which the subject appears against the background 30.

Fig. 2 illustrates one way in which the novel electronic matting techniques of the invention may be applied to a color television system. For simplicity, a color television system based upon the color television standards of the NTSC will be described.

As shown in Fig. 2, the background B against which the subject S is to appear in the composite picture is scanned by a conventional color television camera 10′ which is adapted to provide red, blue and green signals over the conductor means 15R, 15B and 15G to an encoder device 54. The output of the encoded device 54 is fed to background amplifiers 17′ and 18′ identical with the amplifiers 17 and 18 of Fig. 1.

The subject S in front of the background 30 is adapted to be scanned by a conventional subject color television camera 13′ providing red, blue and green outputs over conductor means 37R, 37B and 37G to an encoder device 55 which in turn provides an output to a subject amplifier 38′ substantially like the amplifier 38 in Fig. 1. In order to produce a keying signal, the blue signal is fed over conductor means 36′ to a conventional clipper mixer 35′ which also receives as an input the inverted red signal from an inverter 34′ over the conductor means 33′. The output of the clipper mixer 35' is fed through conductor means 45' to a keying signal amplifier 46' which may be substantially like the amplifier 46 shown in Fig. 1.

Beyond the amplifiers 17', 18', 38 and 46, the electronic matting system may be exactly the same as in Fig. 1 and a detailed description thereof will not be necessary. Operation is essentially the same as in the case of the system of Fig. 1, except that the composite signal output comprises an encoded color television signal representing the background B in which an encoded subject signal has been substituted for a portion of the background signal.

It will be apparent from the foregoing that the invention provides highly effective means for obtaining composite television pictures by electronic matting techniques. By illuminating the actual background for the subject with a color offering the greatest difference between subject and background and combining with the output of a camera tube sensitive to the background color the reversed output of a second camera tube relatively insensitive to the background color to produce a keying signal, good separation can be obtained between the background and the subject. Further, by utilizing a single keying pulse to turn on and off the video signals representing the background and the subject, electronic matting can be effected without producing objectional switching transition lines at the leading and trailing edge of the matted subject.

The specific embodiments described above are, of course, intended to be merely illustrative and variations in form and detail are possible within the spirit of the invention. For example, it is possible to use background colors other than spectral blue and the keying signal may be derived from other combinations of video signals representing different colors in the field scanned by the subject camera. Also, instead of illuminating the subject and its background with widely different colors, it is possible to illuminate them with polarized light of different polarities. Other modifications will be readily apparent to those skilled in the art. The invention, therefore, is intended to cover all such modifications as fall within the scope of the following claims.

I claim:

1. In electronic matting apparatus, the combination of background television camera means, subject television camera means responsive to at least two different colors, means providing scanning synchronization between said subject television camera means and said background television camera means, signal transmission channel means connected to receive the output of said background television camera means, and control means jointly responsive to the output amplitudes of said subject television camera means representing said two different colors for blocking and unblocking said transmission channel means.

2. In electronic matting apparatus, the combination of background television camera means, subject television camera means adapted to provide separate outputs responsive to at least two different colors, respectively, means providing scanning synchronization between said subject television camera means and said background television camera means, first and second signal transmission channel means connected to receive the output of said background television camera means, control means responsive to a combination of the amplitudes of the outputs of said subject television camera means representing said two different colors for blocking and unblocking one of said channels, and means for combining the outputs of said two channels.

3. In electronic matting apparatus, the combination of background television camera means, subject television camera means adapted to provide separate outputs responsive to at least two different colors, respectively, means providing scanning synchronization between said subject television camera means and said background television camera means, first signal transmission channel means connected to receive the output of said background television camera means, second signal transmission channel means connected to receive at least one of the outputs of said subject television camera means, control means responsive to the difference in amplitude between the outputs of said subject television camera means representing said two different colors for blocking and unblocking said first and second television channel means, and means for combining the outputs of said first and second channel means.

4. In electronic matting apparatus, the combination of background means for a subject, means for illuminating said background means with light of given character distinguishing it from other light, subject television camera means disposed to view a subject against said background means and adapted to provide separate outputs responsive, respectively, to light of said given character and to light of a different character, separate background camera means, means providing scanning synchronization between said background camera means and said subject camera means, signal transmission channel means connected to receive an output from one of said camera means, and means jointly responsive to a combination of the amplitudes of the outputs of said subject camera means for blocking and unblocking said transmission channel means.

5. In electronic matting apparatus, the combination of background means for a subject, means for illuminating said background means with light of given character distinguishing it from other light, subject television camera means disposed to view a subject against said background means and adapted to provide separate outputs responsive, respectively, to light of different characteristics, a first normally blocked channel connected to receive at least one of said television camera means outputs, second television camera means, a second normally blocked channel connected to receive an output of said second television camera means, and means responsive to a combination of the amplitudes of the outputs of said first television camera means for producing a keying pulse to unblock said first and second channels.

6. In electronic matting apparatus, the combination of first television camera means adapted to provide separate outputs responsive, respectively, to light of different characteristics, a first normally blocked channel connected to receive at least one of said television camera means outputs, second television camera means, a second normally blocked channel connected to receive an output of said second television camera means, and means responsive to a combination of the amplitudes of the outputs of said first television camera means for producing a keying pulse to unblock said first and second channels.

7. In electronic matting apparatus, the combination of first television camera means adapted to provide separate outputs responsive, respectively, to light of different characteristics, a first channel connected to receive at least one of the outputs of said first television camera means, first unilaterally conductive means rendering said first channel normally nonconductive, second television camera means, a second channel connected to receive an output from said second television camera means, second unilaterally conductive means normally rendering said second channel normally nonconductive, means responsive to the difference in amplitude between the separate outputs from said first television camera means for producing a keying pulse, and means responsive to said keying pulse for rendering said first and second unilaterally conductive devices conducting.

8. In electronic matting apparatus, the combination of background means for a subject, means for illuminating said background means with light of given character distinguishing it from other light, subject television camera means disposed to view a subject against said background means and adapted to provide separate outputs responsive, respectively, to said light of given character and to light of different character, background television camera means synchronized with said subject television camera means and disposed to view a different background, a first channel connected to receive at least one of said separate outputs of said first television camera means, first unilaterally conductive means normally rendering said first channel nonconductive, a second channel connected to receive an output from said background television camera means, second unilaterally conductive means normally rendering said second channel nonconductive, means responsive to the difference in amplitude between said separate outputs of said subject television camera for generating a keying pulse, and means for applying said keying pulse to said first and second unilaterally conductive devices to render said first and second channels conductive.

9. Electronic matting apparatus as defined in claim 8 together with means for inverting the output of said first channel, and adder means jointly responsive to an output from said background camera, to the inverted output of said first channel and to the output of said second channel for producing a composite signal representative of a composite picture.

10. In electronic matting apparatus, the combination of background means for a subject, means for illuminating said background means with light of given color, subject color television camera means disposed to view a subject against said background and adapted to provide separate outputs representative, respectively, of a plurality of colors, first encoder means responsive to the outputs of said subject color television camera means for producing a composite subject color television signal, background color television camera means synchronized with said subject camera means and adapted to provide a plurality of outputs representative, respectively, of a plurality of colors, second encoder means responsive to the outputs of said background color television camera means for producing a background composite color television signal, a first channel connected to receive said composite subject color television signal, first unilaterally conductive means rendering said first channel normally non-conductive, a second channel connected to receive said background composite color television signal, second unilaterally conductive means rendering said second channel normally nonconductive, means responsive to a combination of the amplitudes of at least two different outputs from said subject color television camera means for producing a keying pulse, and means for applying said keying pulse to said unilaterally conductive devices to render said first and second channels conducting.

11. Electronic matting apparatus as defined in claim 10 together with means for inverting the output of said first channel, and adder means jointly responsive to the output of said second encoder means, to the inverted output of said first channel and to the output of said second channel for producing a composite signal representing a matted picture in color.

12. In electronic matting apparatus for making a reproduction of a subject disposed before a background, the combination of means for illuminating the background with light of given character differing markedly from light reflected by the subject, television camera means for producing first television signals representing light of said given character reflected by the subject and background and for producing second television signals representing light of different character reflected by the subject and background, and means responsive to the amplitudes of said first and second television signals for producing a keying signal.

13. The combination set forth in claim 12 in which the illuminating means is adapted to illuminate the background with blue light of high luminance, the television camera means produces first and second television signals representative, respectively, of blue and red light reflected by the subject and background, and the keying signal producing means combines the first and second television signals with their amplitudes in opposition to produce the keying signal.

14. In electronic matting apparatus, the combination of background television camera means, subject television camera means adapted to provide separate outputs responsive to at least two different colors, respectively, means providing scanning synchronization between said subject television camera means and said background television camera means, first and second signal transmission channels connected to receive the output of said background television camera means, third signal transmission channel means connected to receive at least one of the outputs of said subject television camera means, control means responsive to the difference in amplitude between the outputs of said subject television camera means representing said two different colors for blocking and unblocking said third channel and one of said first and second channels, and means combining the outputs of said first, second and third channels.

15. In apparatus for generating a keying pulse for use in electronic matting and the like, the combination of television camera means adapted to provide synchronized signals representing, respectively, at least two different colors in each of a plurality of successively scanned elements of a subject viewed by said camera means, means for combining said signals in inverted relation, and amplitude clipper means connected to receive the output of said signal combining means.

References Cited in the file of this patent

UNITED STATES PATENTS

| | | |
|---|---|---|
| 2,113,473 | Batchelor | Apr. 5, 1938 |
| 2,490,561 | Usler | Dec. 6, 1949 |
| 2,730,565 | Owens | Jan. 10, 1956 |
| 2,784,246 | Hurford | Mar. 5, 1957 |
| 2,611,819 | Serrell | Sept. 23, 1957 |
| 2,808,455 | Moore | Oct. 1, 1957 |